Patented Nov. 2, 1943

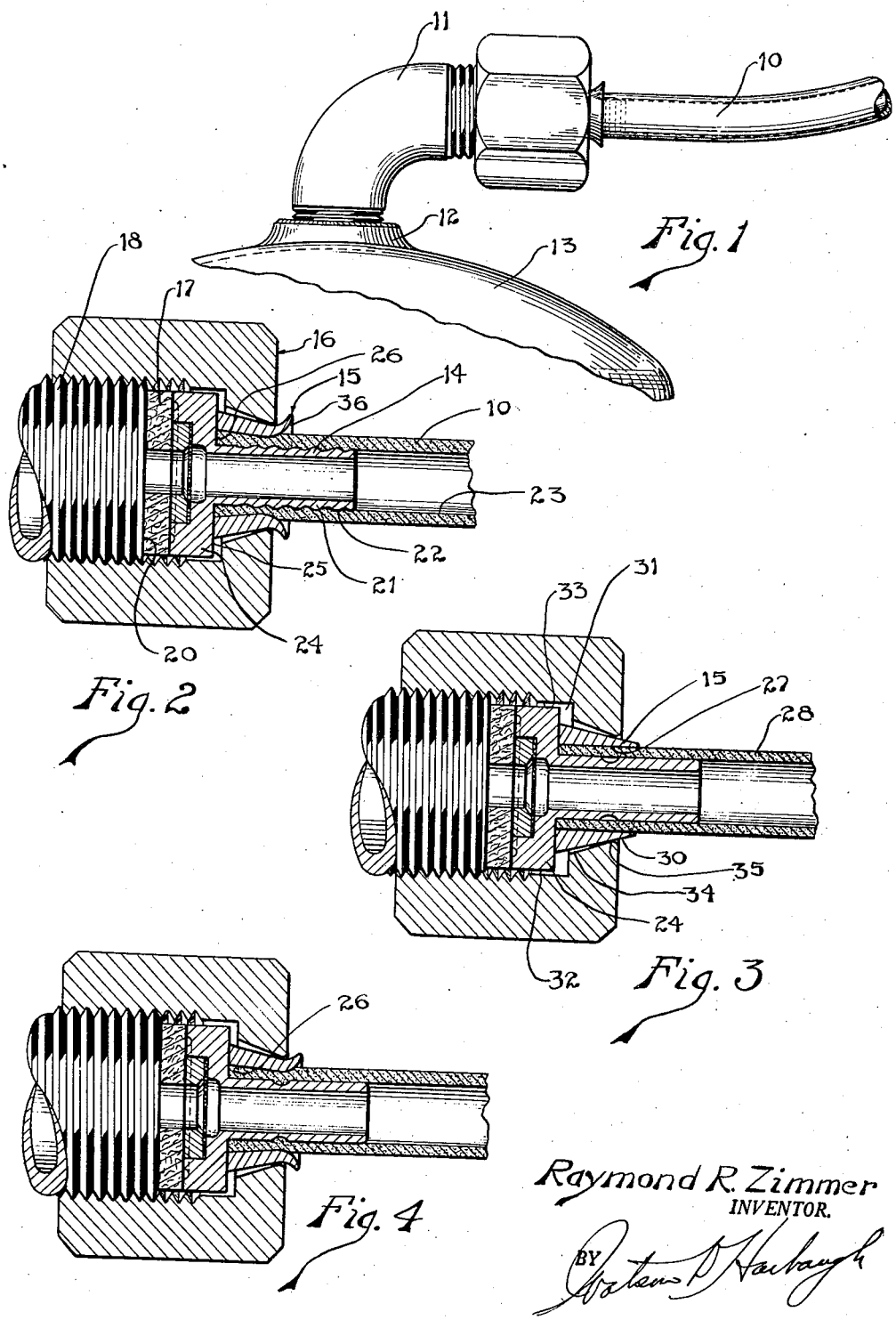

2,333,612

UNITED STATES PATENT OFFICE 2,333,612

COUPLING

Raymond R. Zimmer, Chicago, Ill., assignor to The Bastian Blessing Co., Chicago, Ill., a corporation of Illinois Application May 7, 1942, Serial No. 442,022

6 Claims. (Cl. 285—86)

The present invention relates to couplings generally, and more particularly to a joint by which a flexible conduit member is secured with respect to an opening through which fluid under pressure is expected to flow.

One of the objects of the present invention is to provide a novel coupling by which a conduit made of a plastic having a hardness of Shore A-100 or more, and an elongation range of 10 to 40 percent may be successfully connected to a metal fitting or coupling member to withstand high pressure fluid transmission.

A further object of the invention is to provide an improved coupling construction which can be used with a tube made of plastic such as vinylidene chloride, polyvinyl alcohol, or the like.

Another object is to provide an improved coupling arrangement which can be readily assembled of separate and separable parts which, when once placed in operation acquire the status of an assembled unit which cannot be dismantled and reassembled without detection or destruction.

A further object of the invention is to provide a coupling arrangement made up of a swaging nut and a swaged sleeve which are held in assembled relationship with respect to each other once they have been placed in operation.

A further object of the invention is to provide an improved coupling for the purposes mentioned, which is easy and inexpensive to manufacture, assemble and use, is thoroughly rugged and enduring under work conditions, and provides a coupling arrangement which is very facile to handle.

These being among the objects of the present invention, other and further objects will become apparent from the drawing, the description relating thereto and the appended claims.

Referring now to the drawing:

Fig. 1 is a side elevational view of the preferred embodiment of the invention in which a flexible tube made of a plastic is secured to a high pressure metal connection;

Fig. 2 is a longitudinal section taken through the coupling shown in Fig. 1;

Fig. 3 is a view illustrating the position and construction of the parts slightly modified from these shown in Fig. 2 as they appear before the coupling nut is tightened into place;

Fig. 4 is a longitudinal section similar to Fig. 3 illustrating the form and relationship of the parts illustrated in Fig. 3 after the coupling nut has been tightened into place.

Many attempts have been made to provide a suitable coupling arrangement for a plastic tubing, but either the plastic yields endlessly, flows out, or becomes weakened under pressure at the point where the clamping or securing pressure is applied. Other plastics are too brittle to withstand the pressure established and in most instances the tubing tears or breaks away when subjected to working conditions or vibration.

In the present invention an arrangement has been discovered which, in combination with a plastic having a comparatively wide range both of hardness and the percentage of elongation, is externally forced against an internal support by a member which displaces sufficient of the body of the tubing to provide a clamping relationship that traps in a swaging relationship that part of the body of the tube which makes up the end portion of the tube.

In the practice of my invention, I prefer to draw or swage a portion of a tapering sleeve into clamping relationship with respect to a tube made of a plastic to flare the tapering end of the sleeve outwardly to provide a rounded edge contacting the tube where the tube might otherwise be cut, and, to provide simultaneously therewith a flange which holds the nut in assembled position upon the coupling member.

More specifically, as indicated in Fig. 1, a flexible tube 10, made of such a material as vinylidene chloride or polyvinyl alcohol, having a Shore hardness A-100 or more and an elongation range of 10 to 40 percent is shown connected to a metal elbow 11 which is fastened in a boss 12 upon a high pressure container 13 adapted to hold under pressure a liquefied gas such as butane or propane or other gases such as carbon-dioxide.

Referring to Fig. 2, the connection more particularly comprises a nipple 14, a tapering sleeve 15, a coupling nut 16, a washer 17 and a threaded portion 18 of the elbow 11 squared on its end as at 20 to make up with the washer 17.

More particularly, the nipple 14 has a central portion 21 insertable into the end of the tube 10 and provided with an outer surface 22 which may be roughened, configured or otherwise fashioned irregularly as by knurling or circumferentially grooving to provide a gripping action with the tubing when the tubing is deformed inwardly with its face 23 embedded against the surface 22.

At its outer end the nipple 14 is provided with a radial flange 24 adapted to make up with the washer 17 at its outer end and to provide a shoulder 25 against which the end 26 of the tube 10 engages.

As more particularly shown in Fig. 3, the initial form of the sleeve 15 is shown where it has a preferably cylindrical inner surface 27 of a diameter permitting it to fit snugly over the outer face 28 of the tube 10. The outer surface 30 of the sleeve 15 is frusto-conical having an included angle preferably of approximately 24 degrees.

When the sleeve 15 is inserted in place with the end 26 of the tube 10 brought into contact with the shoulder 25, the sleeve 15 is moved against the shoulder 25 also, after which the nut 16 is brought into its initial position as shown in Fig. 3.

The nut 16 comprises a hollow body suitably threaded or otherwise constructed to be secured to a member such as the elbow 11, it being preferable that the coupling be one made up by a threaded joint which provides a rotary action at the same time that the longitudinal movement is imparted to the nut 16. The nut 16 is cut away as at 31 to clear the flange 24 and the shoulder 25 preferably at all times. Although a centering action may be relied upon between the outer surface 32 of the flange 24 and the inner surface 33 of the nut if upon occasion such is desirable.

Centrally of the nut 16 an opening 34 is provided having frusto-conical walls which provide for an included angle of approximately 37 degrees with the outer and narrower edge 35 of the opening engaging the outer surface of the sleeve 15 a short distance forwardly of the narrow end of the sleeve 15. The mouth of the opening 35 is rounded slightly to dispose the sleeve contacting edge slightly inwardly of the opening where the edge may be supported by metal stock upon both sides to prevent it from turning when longitudinal pressure is applied between the nut and the nipple 14.

Then, as the nut 16 is tightened into place the edge 35 swages the sleeve inwardly and causes the metal in the sleeve to flow inwardly to embed the inner face 23 of the tubing 10 in the outer face 22 of the sleeve, after which the drag of the edge 35 either with or without the resiliency in the tube causes the edge 27 of the sleeve to flare outwardly far enough to provide a flange like member 36 of a diameter greater than the opening 35 to hold the nut 16 in place.

In the swaging of the sleeve as just described, the end portion 26 is more particularly indicated in Fig. 4 as trapped between the inwardly forced portion of the sleeve and the shoulder so that a substantial stock of the tube located there provides an anchor against the tube being withdrawn even when the nut 17 is loosened any time thereafter, the sleeve and the nipple providing sufficient clamping relationship to hold the tube in place without assistance from the nut whenever the coupling is disconnected.

With this particular arrangement, a coupling is provided wherein once assembled same cannot be dismantled without detection or without destroying the assembly.

Although this invention is capable of variation within equivalent limits, a structural arrangement has been found to be quite successful wherein the internal diameter of the sleeve is 1½" long and the external diameter at the small end of the sleeve is 25/64". With the cooperating face 34 of the nut having a diameter at its small portion of .411" and the edge 35 rounded to a .039" radius. Furthermore, the nut may be made from a brass forging and the sleeve from an annealed brass rod.

Consequently, although certain dimensions are given for purposes of illustration, these may be varied, especially if compensatory changes are made in other parts of the device within the purposes and objects of the invention.

Consequently, although the preferred embodiment of the construction has been shown and described, it will be apparent to those skilled in the art that various modifications and changes can be made without departing from the spirit and substance of the invention, the scope of which is commensurate with the appended claims.

What is claimed is:

1. The combination of a tail piece having a roughened outer surface terminating in a shoulder, a tube made of a plastic having a Shore hardness upwards of A-100 and an elongation range of 10 to 40 percent, the inner surface fitting snugly over the outer surface of the tail piece and adapted to rest against said shoulder, a sleeve received over the tube to rest against said shoulder and having a conical outer wall having a predetermined angle of taper, a jam nut received over said sleeve and having an inner conical wall provided with an angle of taper greater than the sleeve wall and terminating in a rounded edge providing an opening of a dimension engaging the sleeve at a point proximate the tapered end of the sleeve, and means for drawing the rounded edge along the tapered sleeve to swage the outer end of the sleeve upwardly to hold the nut in place, and a portion of the sleeve intermediate its ends inwardly to force the body of the tube to conform to the outer face of the tail piece and trap a tapering portion of the end of the tube between said swaged portion and the shoulder.

2. The combination of a tail piece having a roughened outer surface, a tube made of vinylidene chloride, the inner surface fitting snugly over the outer surface of the tail piece, a sleeve received over the tube and having a conical outer wall having a predetermined angle of taper, a jam nut received over said sleeve and having an inner conical wall provided with an angle of taper greater than the sleeve wall and terminating in a rounded edge providing an opening of a dimension engaging the sleeve at a point proximate the tapered end of the sleeve, and means for drawing the rounded edge along the tapered sleeve to swage the outer end of the sleeve upwardly to hold the nut in place and a portion of the sleeve intermediate its ends inwardly to force the body of the tube to conform to the outer face of the tail piece and trap a tapering portion of the end of the tube ahead of said swaged portion.

3. The combination of a tail piece having a roughened outer surface terminating in a shoulder, a tube made of a plastic from a class including vinylidene chloride and polyvinyl alcohol, the inner surface of which fits snugly over the outer surface of the tail piece and is adapted to rest against said shoulder, a sleeve received over the tube to rest against said shoulder and having a conical outer wall having a predetermined angle of taper, a jam nut received over said sleeve and having an inner conical wall provided with an angle of taper greater than the sleeve wall providing an opening of a dimension engaging the sleeve at a point slightly inside the end of the sleeve, and means for drawing the nut along the tapered sleeve to swage the outer end of the sleeve upwardly to hold the nut in place and a portion of the sleeve inwardly to force the body of the tube to conform to the outer face of the tail piece and trap a tapering portion of the end of the tube between said swaged portion and the shoulder.

4. The combination of a tail piece having a knurled outer surface, a tube made of a plastic having a Shore hardness upwards of A-100, the inner surface of which fits snugly over the outer surface of the tail piece, a sleeve received over the tube and having a conical outer wall having a predetermined angle of taper, means for holding the sleeve in a predetermined position, a jam nut received over said sleeve and having an inner conical wall provided with a taper terminating in a rounded edge providing an opening of a dimension engaging the sleeve at a point proximate the tapered end of the sleeve, and means for drawing the rounded edge along the tapered sleeve to swage the outer end of the sleeve upwardly to hold the nut in place, and a portion of the sleeve intermediate its ends inwardly to force the body of the tube to conform to the outer face of the tail piece and trap a tapering portion of the end of the tube between said swaged portion and said holding means.

5. The combination of a tube made of plastic having a Shore hardness upwards of A-100, a tail piece having an outer surface machined to fit snugly within the end of the tube and to embed in the inner wall of the tube, a sleeve received over the tube and having a conical outer wall provided with a predetermined angle of taper, means for holding the sleeve in a predetermined position, a jam nut received over said sleeve and having the relieved inner wall terminating in a rounded edge of a dimension to engage the sleeve at a point intermediate the ends of said taper, and means for drawing the rounded edge along the taper on the sleeve to swage the inner portion of the sleeve inwardly against the tube to trap a tapering portion of the end of the tube between the swaged portion and said holding means and to move the outer end of the sleeve away from the wall of the tube.

6. The combination of a tube made of plastic having a Shore hardness upwards of A-100 and an elongation range of 10 to 40 percent, a tail piece having an outer surface adapted to fit snugly within the end of the tube and to embed in the inner wall of the tube, a sleeve received over the tube and having a tapering outer wall provided with a predetermined angle of taper, means for holding the sleeve in a predetermined position, a jam nut received over said sleeve and having a relieved inner wall terminating in a rounded edge adapted to engage the sleeve at a point intermediate the ends of said taper, said sleeve extending beyond said rounded edge when so engaged, and means for drawing the rounded edge against the tapering wall of the sleeve to swage the inner portion of the sleeve inwardly against the outer surface of the tube to embed the outer surface of the tail piece in the inner wall of the tube and to trap a tapering portion of the end of the tube ahead of said swage, said extending portion of said sleeve being flared slightly outwardly away from the wall of the tube.

RAYMOND R. ZIMMER.